United States Patent [19]

Dzewaltowski et al.

[11] Patent Number: 4,790,545
[45] Date of Patent: Dec. 13, 1988

[54] WORKPART CENTERING MECHANISM FOR A CHUCK

[75] Inventors: Victor F. Dzewaltowski; Walter C. Dodd, both of Springfield, Vt.

[73] Assignee: Bryant Grinder Corporation, Springfield, Vt.

[21] Appl. No.: 142,549

[22] Filed: Jan. 11, 1988

[51] Int. Cl.$^4$ .............................................. B23B 15/00
[52] U.S. Cl. ...................................... 279/1 L; 33/550; 33/642; 33/644; 33/645; 82/45; 279/1 R
[58] Field of Search ............... 279/1 L, 1 M, 1 J, 1 R, 279/6, 111; 82/45, 2.5; 51/277; 33/550, 640, 641, 642, 644, 645; 409/174

[56] References Cited

U.S. PATENT DOCUMENTS

| | | | |
|---|---|---|---|
| 2,434,661 | 1/1948 | Krueger | 33/644 |
| 3,256,754 | 6/1966 | Rivierie et al. | 82/45 |
| 4,653,235 | 3/1987 | Farmer | 51/165.87 |

FOREIGN PATENT DOCUMENTS

| | | | |
|---|---|---|---|
| 1423566 | 10/1968 | Fed. Rep. of Germany | 33/550 |
| 143106 | 7/1980 | German Democratic Rep. | 33/550 |
| 146266 | 2/1981 | German Democratic Rep. | 82/45 |

*Primary Examiner*—Gil Weidenfeld
*Assistant Examiner*—Daniel W. Howell
*Attorney, Agent, or Firm*—Edward J. Timmer

[57] ABSTRACT

A workpart chuck is provided with a centering member that is movable toward the axis of rotation of the chuck as the chuck rotates the workpart in an eccentric non-centered position. As the centering member moves the workpart, a sensing device senses the extent of changing eccentric movement of the workpart and generates an electrical signal that is indicative of the extent of such eccentric movement. The workpart is moved toward the chuck axis until the signal reaches a predetermined value indicative that the workpart is rotating about its axis; i.e., the workpart axis and chuck axis are substantially coaxial. The centering member is offset slightly relative to the chuck axis of rotation to assure that excessive movement of the centering member placing the workpart center beyond the chuck axis of rotation will not result in the workpart being driven to an extremely eccentric position and possibly even off the face of the chuck. The sensing device will detect a sudden shift of the workpart position relative to the centering member indicative of such movement beyond center, whereupon the control system will cause the centering member to retract a small distance and advance in a new attempt to center the workpart.

21 Claims, 3 Drawing Sheets

WORKPART CENTERING MECHANISM FOR A CHUCK

FIELD OF THE INVENTION

The invention relates to machine tools such as internal and external grinding machines and, in particular, to a workpart centering mechanism for a workpart chuck for holding and rotating the workpart for machining on a machine tool.

BACKGROUND OF THE INVENTION

In production type of machining operations, magnetic faceplate chucking is infrequently used since time is lost and skilled operator attention is required for centering each workpiece on the faceplate. A dial indicator and skillfully dealt hammer blows to the workpiece are required to center the workpiece. Of course, the object for the operator is to center the workpiece on the faceplate with the geometrical axis of the workpiece substantially coaxial with the rotational axis of the faceplate that is attached on a rotatable spindle.

It is an object of the invention to provide a centering mechanism for centering a workpiece on a magnetic or other chuck and which eliminates the time consuming and labor intensive manual centering technique and is amenable for automatic control by a machine tool control unit.

SUMMARY OF THE INVENTION

The invention contemplates a workpart centering mechanism for a magnetic or other chuck wherein the centering mechanism is operable to center a workpart from a position where the workpart axis of geometry is offset from the axis of rotation of the chuck to a position where the axes are generally aligned.

The workpart is positioned on the chuck initially with its (workpart) axis offset and thus moving in an eccentric path around the chuck axis as the chuck rotates. In a typical working embodiment, the workpart centering mechanism includes a movable centering member preferably having a pair of shoes engageable with the workpart for moving the workpart axis toward the chuck axis such that the eccentric path changes as the workpart is moved and also includes means for sensing the extent of eccentric movement of the workpart and generating a signal that is indicative of the extent of such eccentric movement. The centering mechanism includes means such as a servo motor or other prime mover for moving the centering member toward the chuck axis until the signal from the sensing means reaches a predetermined level or value indicative that the workpart is rotating substantially about its own axis and not eccentrically.

In a preferred embodiment of the invention, the centering member includes spaced apart first and second shoes for advancing the workpart toward the chuck axis with the workpart engaged on one shoe and with the shoes offset relative to the chuck axis. If the workpart axis is moved slightly past the chuck axis, the workpart snaps to a new position engaged on both the first and second shoes of the centering member. This snap action of the workpart can be employed as feedback to effect automatic withdrawal of the centering member and re-centering of the workpart.

In the preferred mode of operation of the invention, the centering member is withdrawn slightly away from the workpart after the workpart is centered so that the workpart can rotate freely about its axis. The centering member remains close enough to the workpart to prevent excessive movement of the workpart in the event of accidental application of grinding forces in excess of the chucking and friction forces holding the workpart in position on the chuck.

The sensing means may sense workpart position, velocity or acceleration as the workpart is rotated on the chuck with its axis traveling in an eccentric path and provides a cyclic signal whose amplitude is proportional to the extent of such eccentric movement. Or, the sensing means may sense the duty cycle of contact between the workpart and centering member as the latter is advanced toward the chuck axis to provide a signal which the controller can combine with other information, such as rate of centering member advance, to determine the extent of such eccentric movement.

The invention contemplates a method for centering a workpart on a rotating chuck including moving the workpart axis toward the chuck axis as the chuck rotates the workpart axis eccentrically sensing the extent of eccentric movement as the workpart moves and generating a signal that is indicative of the extent of such eccentric movement. The workpart preferably is moved toward the chuck axis until the signal reaches a value indicative that the workpart is centered on the chuck.

BEST MODE FOR PRACTICING THE INVENTION

Figure 1:
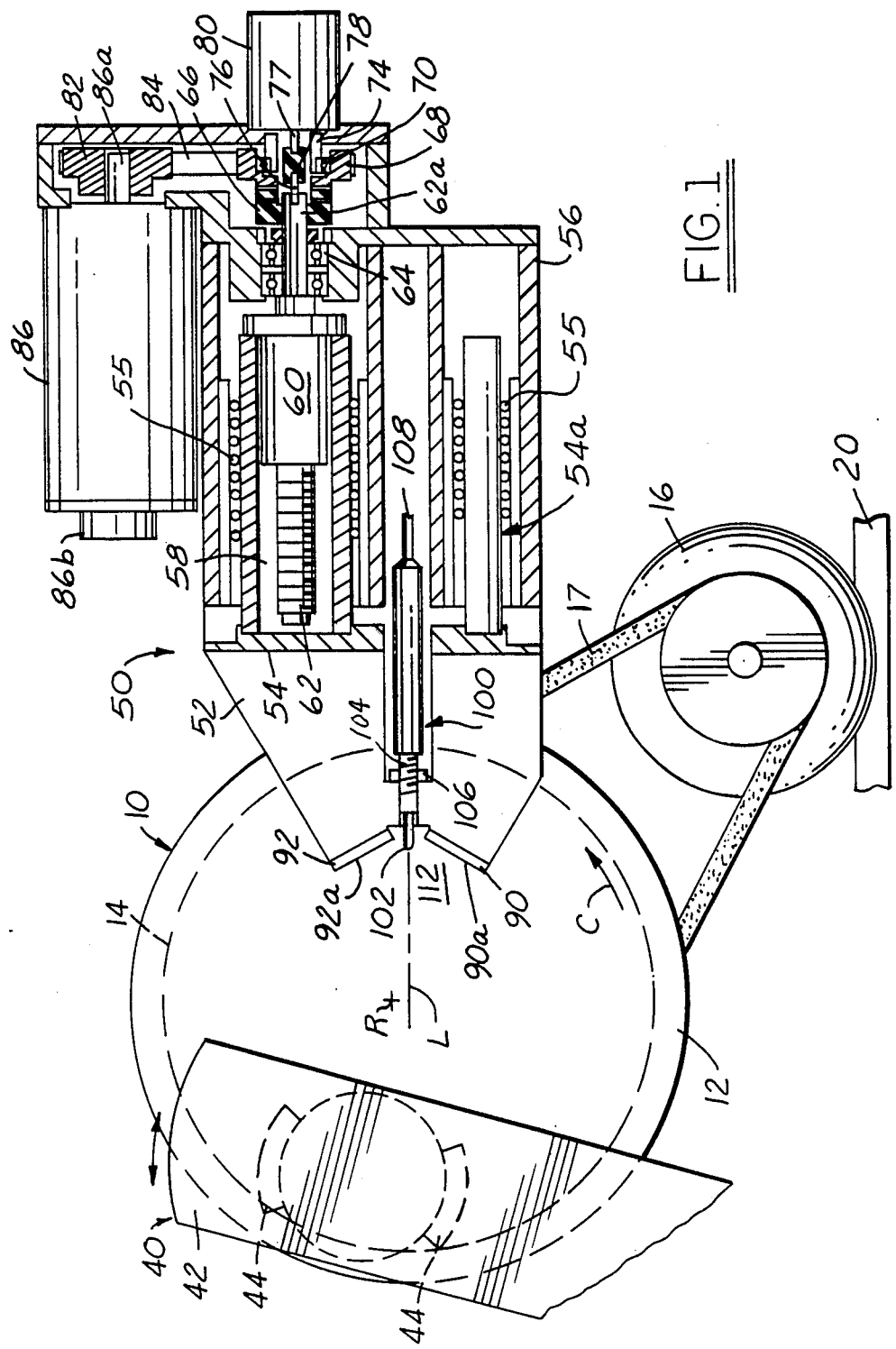
FIG. 1 is a front elevation of the magnetic workpart chuck of the invention having a workpart centering mechanism.

FIGS. 1 through 4 illustrate a magnetic workpart chuck 10 for an internal or external grinding machine, although the invention is not limited to grinding machines or to magnetic chucks. As is known, an annular workpart W is held on magnetic chuck faceplate 12 with the rotational axis of the workpart and faceplate 12 substantially coaxial or aligned. The chuck faceplate is attached on a rotatable spindle 14 in known fashion and spindle 14 is rotated by an electric motor 16 or other conventional and known means. The spindle 14 and motor 16 may comprise separate components drivingly connected for example by a drive belt 17 or pulleys, gear train, etc., or the spindle and motor may be integrated to provide a motorized spindle.

A suitable faceplate for use in the invention is available commercially as model no. AXM-8896 available from O.S. Walker Inc., Worcester, Mass.

Known mechanical workpart clamps or chucks can be used in the invention in lieu of the magnetic faceplate; e.g., roll clamping and air clamping where the workpart is held by rollers or air pressure against a faceplate on a spindle can be used in lieu of the magnetic faceplate 12 to be described below.

Spindle 14 and electric motor 16 are typically mounted on the base 20 of the grinding machine or a slide (not shown) movable on the base.

Figure 4:
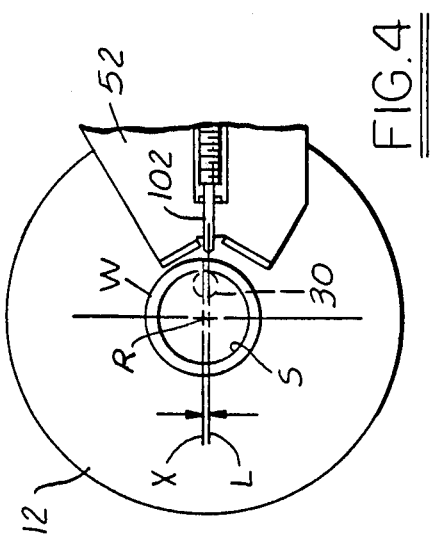
FIG. 4 is similar to FIG. 3 with the workpart substantially centered and the centering shoes slightly withdrawn from the workpart.

A grinding wheel 30 is moved into the workpart bore for internal grinding and rotated and reciprocated against the inner annular surface S to grind same, FIG. 4. The grinding wheel is radially fed into the annular surface at a desired feed rate until the final ground dimension is achieved. The mechanism for moving the grinding wheel is well known in the art e.g., U.S. Pat. No. 4,653,235 issued Mar. 31, 1987, and forms no part of the present invention.

As is known, during grinding, the workpart W is centered on chuck faceplate 12 with its rotational (geometrical) axis substantial coaxial with the rotational axis R of the faceplate and spindle.

Typically, successive workparts are ground one after another until the desired number have been ground. A workpart loader/unloader 40 is provided to place an unground workpart on the faceplate 12 after the previously ground workpart is removed therefrom. Loader/unloader 40 is illustrated schematically as including a pivotal arm 42 having workpart grippers 44. The pivotal arm is pivoted from a source of unground workparts to carry an unground workpart to a position in front of the faceplate 12. When the pivotal arm is in front of the faceplate, the pivotal arm is axially slidable in a direction toward the faceplate 12 to deliver a workpart W to the faceplate 12 and is slidable axially away from the faceplate and then pivoted to allow grinding. After grinding of the workpart, the pivotal arm is pivoted and then moved axially toward the faceplate to grip the ground workpart and axially away to remove the ground workpart from the faceplate 12. The arm is then pivoted to discharge the ground workpart and to pick up an unground workpart for placement on faceplate 12. The sequence of movements of the pivotal and axially movable arm is repeated for each workpart. Such workpart loaders/unloaders are known in the art; e.g., available on Bryant 2209D-II internal grinder available from Bryant Grinder Corporation, Springfield, Vermont, and form no part of the invention. Workpart loaders/unloaders of other known types may be used in the invention.

Regardless of the workpart loader employed, the loader does not place the workpart on faceplate 12 in an exactly centered position with the workpart geometrical axis and chuck axis substantially coaxial. Instead, the workpart typically is placed on the faceplate with a characteristic offset of the workpart axis G from the chuck axis R (FIG. 2) such that rotation of the chuck causes the workpart axis to travel in an eccentric path.

The same off-center positioning of the workpart will be experienced in the event the workpart is loaded onto the faceplate 12 manually by the machine operator.

Figure 2:
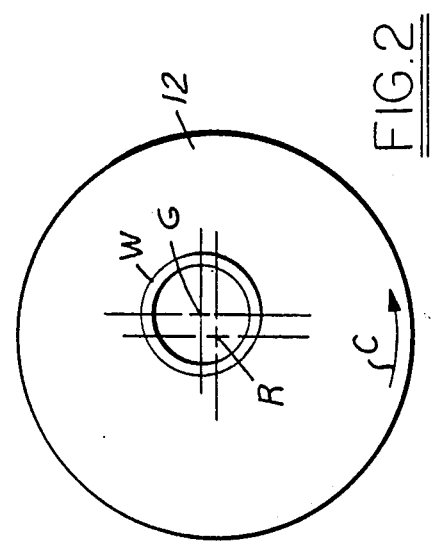
FIG. 2 is a partial front elevation of the chuck showing the workpart initially off-center on the chuck.

The invention provides a centering mechanism 50 for repositioning the workpart of FIG. 2 to a centered position on the faceplate 12 shown in FIG. 4 with the workpart axis and chuck axis substantially coaxial in much reduced time and with much less involvement of the machine operator. As mentioned above, the centering mechanism of the invention can be used on magnetic chucks and also on other known mechanical chucks such as roll clamping, air clamping and other workpart clamps or chucks.

Referring to FIG. 1, the centering mechanism includes centering member 52 that is mounted on a ball slide 54 employing two cylindrical slide bars 54a. Ball slide 54 itself is slidably mounted in housing 56 by balls 55 between the slide bars and housing.

Ball slide 54 includes an axially extending bore 58 in which a ball nut 60 is received and fastened to the slide for movement therewith. Extending through the ball nut 60 is a ball screw 62 rotatably mounted in antifriction bearings 64 on housing 56. Ball screw 62 includes end 62a extending out of the housing to flexible coupling 66 where end 62a is connected to a pulley 68 through the flexible coupling.

Pulley 68 rotates on antifriction bearings 70. Bearings 70 are disposed between the inner annular surface of pulley 68 and a tubular collar 74 fastened to housing 56 by suitable means.

A small diameter shaft 76 extends axially from ball screw end 62a to a flexible coupling 78 and a similar shaft 77 extends from coupling 78 to ball screw position transducer 80 such as an encoder available commercially from Dynamics Research Corp., of Wilmington, Mass.

Pulley 68 is driven in rotation by pulley 82 through belt 84. Pulley 82 is rotated by output shaft 86a of D.C. servomotor 86 commercially available as model no. TT 2950 from Inland Motors, Industrial Drives Division, Kollmorgan Corp., of Radford, Va. Servomotor 86 may include a tachometer 86b therein to provide feedback to control unit 110.

Of course, rotation of the ball screw 62 causes ball nut 60 and slide 54 to move linearly in one direction or the other depending upon the direction of rotation of the ball screw.

Ball slide 54 carries on its forward end centering member 52 including first and second diverging shoe inserts 90,92 defining an included angle therebetween. Shoe inserts 90,92 define an included angle of about 120° and are spaced apart at their inner apex. An elongate sensor 100 is disposed between the shoe inserts as shown. The included angle defined by the shoe inserts is not limited to 120° and may be in a preferred range of about 90° to 140°.

The sensor may be in the form of a linear variable differential transformer (LVDT) sensor available commercially from Schaevitz Engineering Co. of Pennsauken, N.J. Sensor 100 includes probe 102 positioned between shoe inserts 90,92. Probe 102 is adjustably positioned relative to insert shoes 90,92 by threaded portion 104 and lock nut 106.

Figure 6:
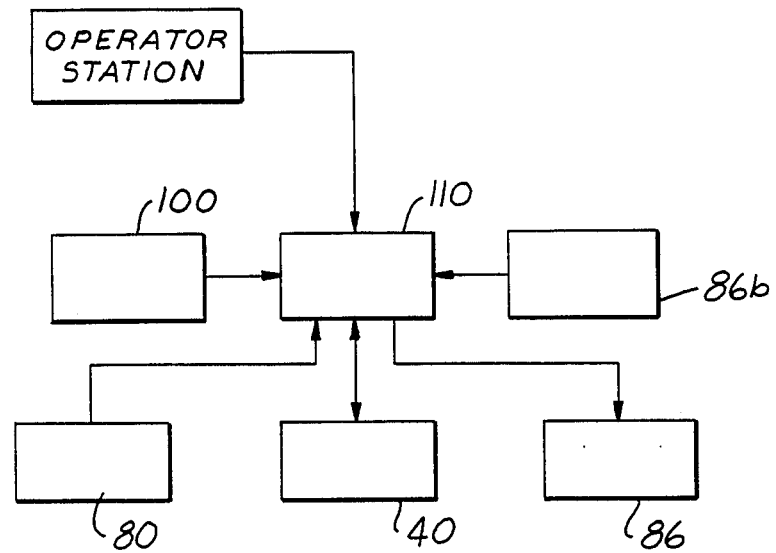
FIG. 6 is a schematic view of the control system for the centering mechanism.

Sensor 100 includes a lead 108 that extends through housing 56 to a control unit 110, FIG. 6.

Shoe inserts 90,92 take the form of rectangular plates permanently or, optionally, releasably attached on the centering member 52. The shoe inserts define a pocket 112 adapted to receive the off-center workpart on faceplate 12 as will be explained.

Figure 3:
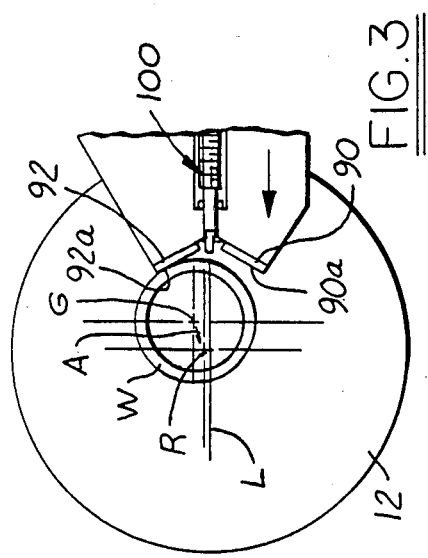
FIG. 3 is similar to FIG. 2 with the workpart off-center and engaged by one of the centering shoes.

Shoe inserts 90,92 preferably are positioned relative to the rotational axis of faceplate 12 and spindle 14 to have only shoe insert 92 initially engage the workpart and to move the workpart of FIG. 2 toward the rotational axis R of the faceplate (see arrow A of FIG. 3).

Such engagement of shoe insert 92 with the workpart is shown in FIG. 3. It is apparent that the workpart initially engages only shoe insert 92 and not shoe insert 90. This is accomplished by locating the shoe inserts so as to make the imaginary line L which bisects the included angle formed by the contact surfaces 90a,92a of the inserts (hereafter referred to as bisector) offset a distance X laterally of the rotational axis R. The bisector is offset in a direction opposite to the direction of rotation (arrow C) of the faceplate 12 for reasons to be explained. The statement that the bisector is offset in a direction opposite of the direction of rotation is intended to mean that a point on the rotating chuck faceplate approaching the centering member 52 will cross the bisector (line L) before it crosses a line that extends through the center of the rotating chuck faceplate and that is parallel to the bisector. Distance X typically is about 10 mils (0.010 inch).

In typical operation of the magnetic workpart chuck, machine control 110 sets the magnetic intensity of faceplate 12 to a first predetermined level and commands the loader/unloader 40 to place a workpart on the faceplate 12 as shown in FIG. 2. Once the workpart is loaded, the magnetic intensity is changed to a second predetermined level higher than the first level.

Faceplate 12 can be rotated during loading or is rotated immediately following loading of the workpart thereon. Since the workpart is loaded offcenter on the faceplate 12, the control 110 directs the centering mechanism to advance shoe inserts 90,92 on centering member 52 from an initial starting position toward the chuck rotational axis R. The centering member 52 and shoe inserts thereon is advanced at a first predetermined speed as the faceplate 12 rotates the off-center workpart with its workpart axis traveling along an eccentric path. The eccentric path of movement of the workpart changes as it is moved toward the chuck axis. As the shoe inserts 90,92 are advanced by servomotor 86, the transducer 100 may initially make no contact or only intermittent contact with the eccentrically rotating workpart. However, as shoe insert 92 continues to nudge the workpart closer to the rotational axis R of the faceplate in the direction of small arrow A in FIG. 3, contact between transducer 100 and the offcenter workpart eventually becomes continuous and the amplitude of the cyclically varying signal (approximate sine wave) from the transducer becomes proportional to the extent or magnitude of eccentric movement of the workpart.

When this amplitude reaches a first predetermined level or value, the speed of advance of the centering member 52 and workpart engaged by shoe inserts 90,92 is reduced optionally to a second lower level or value. When the amplitude of the signal from transducer 100 reaches a second predetermined value lower than the first value and indicative of the workpart rotating about its own axis; i.e., with its axis substantially coaxial with rotational axis R, the control unit 110 directs the servomotor 86 to stop and optionally to reverse direction to retract shoe inserts 90,92 away from the now centered workpart a selected small amount, FIG. 4. This optional retraction will prevent needless rubbing/wear between the shoe inserts and workpart and yet will position the shoe inserts sufficiently close to the workpiece to prevent excessive movement of the centered workpart in the event o accidental application of grinding forces exceeding the magnetic and friction holding force between the faceplate 12 and the workpart.

Moving the workpart toward rotational axis R with the bisector of shoe inserts 90,92 offset (distance X) has been found to be important in case the workpart is advanced slightly too far past the chuck axis R. The inventors found that with the offset present, the workpart will snap from the position of FIG. 3 to the position of FIG. 5 into full contact with both shoe inserts 90,92 if the workpart axis is advanced slightly past the rotational axis R and the workpart will remain against shoe inserts 90,92. If the offset is not present, the inventors have found that the workpart moves to another highly eccentric position on, or more likely off, faceplate 12 if the workpart axis is advanced slightly past rotational axis R.

However, advancement of the workpart center G past the chuck axis R a distance in excess of the offset X will result in all likelihood in the workpart being "ejected" or removed from the rotating faceplate 12. Use of offset X during advance of the workpart provides improved control of workpart positioning since the snap over will occur and alert the control unit or operator that the workpart is advanced too far.

Figure 5:
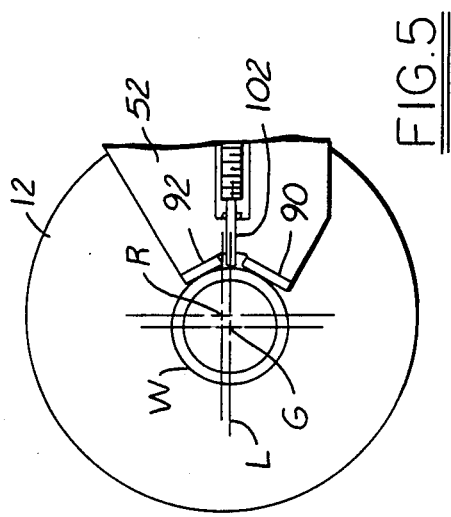
FIG. 5 is similar to FIG. 3 after the workpart has been advanced too far past chuck axis R and has snapped to a position in engagement with both shoes of the centering member.

In particular, with the offset present to cause the workpart to snap to the new position in contact with both shoe inserts 90,92, FIG. 5, the control unit 110 can receive feedback from transducer 100 that contact of the workpart with both shoes 90,92 exists and can direct a predetermined amount of retraction of the shoe inserts. The control unit can then restart the normal centering movement of the shoe inserts toward the rotational axis R. In effect, the snapping of the workpart into contact with both shoe inserts 90,92 is sensed as indicative of advancement of the workpart and shoe inserts slightly too far and is provided as feedback to control unit 110.

After the grinding operation has been completed for each workpart, control unit 110 directs servomotor 86 to rapidly retract centering member 52 to the original initial starting position away from the rotational axis R and directs the loader/unloader 40 to remove the ground workpart from the faceplate 12. Then, loader/unloader 40 is directed to place another workpart on faceplate 12 as described above and the centering and grinding steps are repeated.

The various predetermined positions, rates (speeds) of advance or retraction of centering member 52 and signal levels or values are programmable by the operator into control unit 110 so that processing may be made reasonably close to optimum for each type of workpart. Control unit 110 comprises a programmable computer control, such as Series One/Plus available from GE Fanuc of Charlottesville, Va.

The control system shown in FIG. 6 can be made adaptive to have the capability to learn the starting position where shoe insert 92 first makes contact with the off-center workpart and optionally a second position where the shoe inserts are to be positioned to place the workpart sufficiently well centered on faceplate 12. This would permit the control system to place the shoe inserts at the proper starting position without the operator having to determine that position(s) and manually enter or input it to the control unit 110. The optional second position could permit a very rapid rate of advance of shoe inserts 90,92 to a position just short of the learned workpart centered position This would be followed by a brief period of advance to a desired centered position at a sped needed to avoid overshoot of the shoe inserts 90,92 past the desired centered position, thereby reducing time required for the centering process.

Although diverging shoe inserts 90,92 have been illustrated above, those skilled in the art will appreciate that a variety of workpart shoe or nesting devices could be used. Also, instead of advancing linearly, shoes 52 could advance along an arc about a pivot or along other curvi-linear paths. And, in lieu of servomotor 86 and ball nut/screw 60,62, other prime mover mechanisms for moving the centering member or shoes 52 can be used.

And, although the centering member or shoes 52 are shown generally horizontally oriented, orientations other than horizontal can be used and may depend on the characteristics of the particular loader/unloader 40. Transducer 100 can be carried on and movable with the centering shoe 52 but the invention is not so limited.

Transducer 100 is illustrated as an LVDT position sensor but velocity or acceleration sensors can also be used to sense workpart velocity or acceleration as it rotates eccentrically on face plate 12 during the movement toward chuck axis R. Also, the sensor may sense the number and duration of contacts between the workpart and shoe inserts 90 or 92 during advancement toward the center of faceplate 12. For example, electrical contact or vibration due to rubbing contact between the workpart and shoe inserts could be sensed. Contact force between the workpart and shoe inserts could also be sensed.

Furthermore, in some situations, the machine operator may manually control servomotor 86 in response to signals from transducer 100 to center the workpart without having to use control unit 110. For example, the machine operator could stop and reverse the servomotor once the signal from the transducer or other sensor indicates the workpart is rotating about its own axis. Thus, motor 86 need not be a servomotor and other prime movers such as a fluid cylinder or other means may be used to move the centering member. Moreover, automatic control unit 110 is optional in the invention, although preferred for production type of machining operations.

While the invention has been described in terms of specific embodiments thereof, it is not intended to be limited thereto but rather only to the extent set forth hereafter in the following claims.

We claim:

1. In combination with a workpart chuck having a chuck axis of rotation for rotating a workpart about its workpart axis when the axes are substantially aligned, apparatus for centering the workpart on the rotating chuck from an initial offset position where the workpart axis moves in an eccentric path relative to the chuck axis, comprising:
   a centering member movable relative to the chuck axis as the chuck rotates the workpart and engageable with the workpart for moving the workpart axis toward the chuck axis with said eccentric path changing as the workpart moves, means for sensing the extent of eccentric movement of the workpart as the centering means moves the workpart and generating a signal that is indicative of the extent of said eccentric movement, and means for moving the centering member toward the chuck axis until said signal reaches a predetermined value indicative that the workpart is rotating substantially about its own workpart axis.

2. The apparatus of claim 1 wherein the sensing means is a sensor providing a cyclic signal whose amplitude is proportional to the extent of said eccentric movement during movement toward the chuck axis.

3. The apparatus of claim 2 wherein the sensor is a position sensor, velocity sensor or acceleration sensor.

4. The apparatus of claim 1 wherein the sensing means is a sensor providing a signal whose duty cycle when taken with the advance rate of the centering member is indicative of the extent of said eccentric movement.

5. The apparatus of claim 4 wherein the sensor is a contact sensor for sensing the occurrence of contact between the workpart and centering member during movement toward the chuck axis.

6. The apparatus of claim 1 wherein the centering member includes contact surfaces between which an included angle is defined and between which the workpart is moved toward the chuck axis with a bisector of the included angle offset from the chuck axis.

7. The apparatus of claim 6 wherein the bisector is offset in a direction opposite of the direction of rotation of the chuck.

8. The apparatus of claim 1 wherein said means for moving said workpart retracts away from the workpart in response to said predetermined value.

9. The apparatus of claim 1 wherein the centering member comprises a pair of spaced apart diverging shoes, one of said shoes engaging the workpart to advance it toward the chuck axis, and the sensing means is disposed on the centering member between the shoes.

10. A method for centering a workpart on a rotating chuck comprising the steps of rotating the chuck with the workpart geometrical axis offset from the chuck axis of rotation so that the workpart axis moves eccentrically, moving the workpart axis toward the chuck axis as the chuck rotates such that the eccentric movement changes as the workpart axis is moved toward the chuck axis and generating a signal that is indicative of the extent of eccentric movement as the workpart axis moves toward the chuck axis.

11. The method of claim 10 wherein the workpart is moved toward the chuck axis until said signal reaches a predetermined value indicative that the workpart is rotating substantially about its own axis.

12. The method of claim 11 wherein a centering member is retracted away from the centered workpart in response to the signal reaching said predetermined value.

13. The method of claim 10 wherein the workpart is moved toward the chuck axis between a pair of contact surfaces whose bisector is offset from the chuck axis of rotation.

14. The method of claim 13 wherein the bisector is offset in a direction opposite to the direction of rotation of the chuck.

15. The method of claim 13 wherein the workpart is moved toward the chuck axis of rotation with the workpart engaging against one of said contact surfaces.

16. The method of claim 15 wherein the workparts snaps to a position in engagement with both contact surfaces in the event the workpart geometrical axis is moved past the chuck axis of rotation.

17. The method of claim 16 wherein the workpart and contact surfaces are retracted away from the chuck axis in response to snapping of the workpart against both contact surfaces.

18. The method of claim 10 wherein said signal is generated by sensing workpart position, velocity or acceleration.

19. The method of claim 18 wherein said signal is generated as a cyclic signal whose amplitude is indicative of the magnitude of said eccentric movement.

20. The method of claim 10 wherein said signal is generated by sensing the duty cycle of contact between the workpart and a shoe during movement toward the chuck axis.

21. The method of claim 20 wherein said signal is taken together with the advance rate of the centering member to be indicative of the magnitude of said eccentric movement.

* * * * *